Nov. 18, 1969     T. F. SARAH     3,478,977
FLY REEL HAVING PRIMARY AND SECONDARY DRAG MEANS
Filed Jan. 3, 1967     3 Sheets-Sheet 1

INVENTOR.
THOMAS F. SARAH
BY Hamilton & Cook
ATTORNEYS

Nov. 18, 1969  T. F. SARAH  3,478,977
FLY REEL HAVING PRIMARY AND SECONDARY DRAG MEANS
Filed Jan. 3, 1967  3 Sheets-Sheet 2

INVENTOR.
THOMAS F. SARAH
BY Hamilton D Cook
ATTORNEYS

Nov. 18, 1969     T. F. SARAH     3,478,977
FLY REEL HAVING PRIMARY AND SECONDARY DRAG MEANS
Filed Jan. 3, 1967     3 Sheets-Sheet 3

INVENTOR.
THOMAS F. SARAH
BY Hamilton & Cook
ATTORNEYS

United States Patent Office 3,478,977
Patented Nov. 18, 1969

3,478,977
FLY REEL HAVING PRIMARY AND SECONDARY DRAG MEANS
Thomas F. Sarah, Akron, Ohio, assignor, by mesne assignments, to Shakespeare Company, Kalamazoo, Mich., a corporation of Delaware
Filed Jan. 3, 1967, Ser. No. 606,723
Int. Cl. A01k 89/02
U.S. Cl. 242—84.45        12 Claims

ABSTRACT OF THE DISCLOSURE

This reel uses both a selectively releasable primary drag means and a continuously applied secondary drag means. The reel spool is supported for rotation in the winding direction by a suitable crank means. The primary drag means includes friction elements engaging the spool with an adjustable force and connected through a pawl and ratchet arrangement to the frame to retard unwinding of the line, e.g., by the pull of a fish. Lever operated cam means on the frame is manually actuated to disconnect the pawl and ratchet to permit unwinding of the line, e.g., by the user. However, the secondary drag means remains operative between the frame and spool to prevent the line from being unwound too freely.

Background of the invention

The present invention relates generally to fly reels. More particularly, the present invention relates to single action fly reels having both a primary and a secondary drag means. Specifically, the present invention relates to a fly reel having a selectively operative, variable primary drag means and a secondary drag means of lesser magnitude than the primary drag means which is operative at least when the primary drag means is not operative.

The purpose of the reel in fly fishing is simply to hold the spool on which the line is stored and to provide a means to wind and unwind the line from the spool. There are three basic types of fly reels: the automatic, single action and multiple action.

The automatic fly reel has a spring-operated spool which retrieves line automatically whenever you press the line retrieve lever. The single action fly reel is so named because the line spool makes one complete revolution for each turn of the handle. The multiple action reel provides more than one revolution of the spool for one turn of the handle and accordingly does retrieve line faster. However, fishing contests almost universally stipulate single action reels, and the present invention is therefore disclosed in conjunction with such a reel.

Heretofore, single action fly reels have been provided with drag mechanisms. Those reels imparted the same restriction to turning of the spool during retrieve as when the line was being stripped from the reel. Moreover, with such constructions the handle always turned with the spool so that when a fish having a long and strong initial run struck, the handle turned with the same brutal speed as the spool. To protect the knuckles as much as possible the control knob for adjusting the brake was generally placed on the opposite side of the reel from the handle. This, however, presents an awkward arrangement in that it requires either that the fisherman change hands to operate the control knob or reach over, or under, the reel to operate the knob with the opposite hand.

Other reel manufacturers, in an attempt to obviate the necessity of overcoming the resistance imparted to the spool by the brake during retrieve, supplied their fly reels with an adjustable drag means operative between the line spool and the handle. Here too many manufacturers permitted the handle to rotate as line was being stripped from the spool. By this construction there was no built-in resistance for the fisherman to overcome while retrieving the line, but an anti-reverse pawl was required so that the drag would operate upon relative rotation between the spool and the handle.

And, because an anti-reverse pawl is used, the fisherman is put to the task of overcoming the drag resistance every time he attempts to strip the line from the spool. He could, of course, reduce the drag setting every time before stripping off line for the cast and then attempt to reset it before playing the fly. This at best, is a make shift arrangement which tends to preclude effective presetting of the drag in balance with the rod, line, leader, tippet and fly being used.

Presetting of the desired drag is particularly important when fly fishing for those fish known for their spirited fight. For example, it is commonplace for the noteworthy salt water speedster the bonefish to make runs of 350 to 400 feet. When one considers the formidable load such a fish is dragging merely by way of the line and the preset drag it is readily apparent that something would break if he weren't permitted to run against a thoughtfully selected preset drag.

Summary of the invention

It is therefore an object of the present invention to provide a fly reel having a selectively operative primary drag and a secondary drag operative when said primary drag is inoperative.

It is another object of the present invention to provide a fly reel, as above, in which the primary drag is selectively adjustable to provide a predetermined resistance to rotation of the line spool.

It is yet another object of the present invention to provide a fly reel, as above, in which the primary drag means supplies a preselected resistance while said primary drag means is selectively operating, the secondary drag supplies a resistance of lesser magnitude while said primary drag means is selectively inoperative, and which will immediately reinstate the previously preselected resistance when the primary drag means is made reoperative.

It is still another object of the present invention to provide a fly reel, as above, having anti-reverse means to prevent reverse rotation of the handle when either the primary or secondary drag means is operative.

It is a further object of the present invention to provide a fly reel, as above, in which the secondary drag means permits facile stripping of the line from the reel during the cast without adversely affecting the fisherman's timing and yet prevents overrunning of the spool.

It is a still further object of the present invention to provide a fly reel, as above, in which the knob for adjusting the primary drag means may be on the same side of the reel as the handle.

It is an even further object of the present invention to provide a fly reel, as above, in which the primary and secondary drag means are so compact that the hub diameter of the line spool need not encroach upon the storage capacity of the spool.

It is a yet further object of the present invention to provide a fly reel, as above, in which the line spool is easily removable from, and replaceable in, the housing of the reel.

These and other objects which will become apparent from the following specification are accomplished by means hereinafter described and claimed.

In general a fly reel according to the concept of the present invention has a spool mount rotatably mounted within the housing of the reel. A spool is received on the spool mount for rotation with and with respect thereto. Crank means are provided so that the spool can be rotated from exteriorly of the reel and an adjustable primary drag means is operative between the line spool and the crank means. A control means is provided for allowing selective operation of the primary drag means. In addition, a secondary drag means is provided, the secondary drag means preferably comprising an anti-reverse ratchet wheel carried on the line spool and spool mount for rotation therewith and restricted rotation with respect thereto.

One preferred embodiment is shown by way of example in the accompanying drawings and described in detail without attempting to show all of the various forms and modifications in which the invention might be embodied; the invention being measured by the appended claims and not the details of the specification.

DESCRIPTION OF A PREFERRED EMBODIMENT

Figures 1, 2:
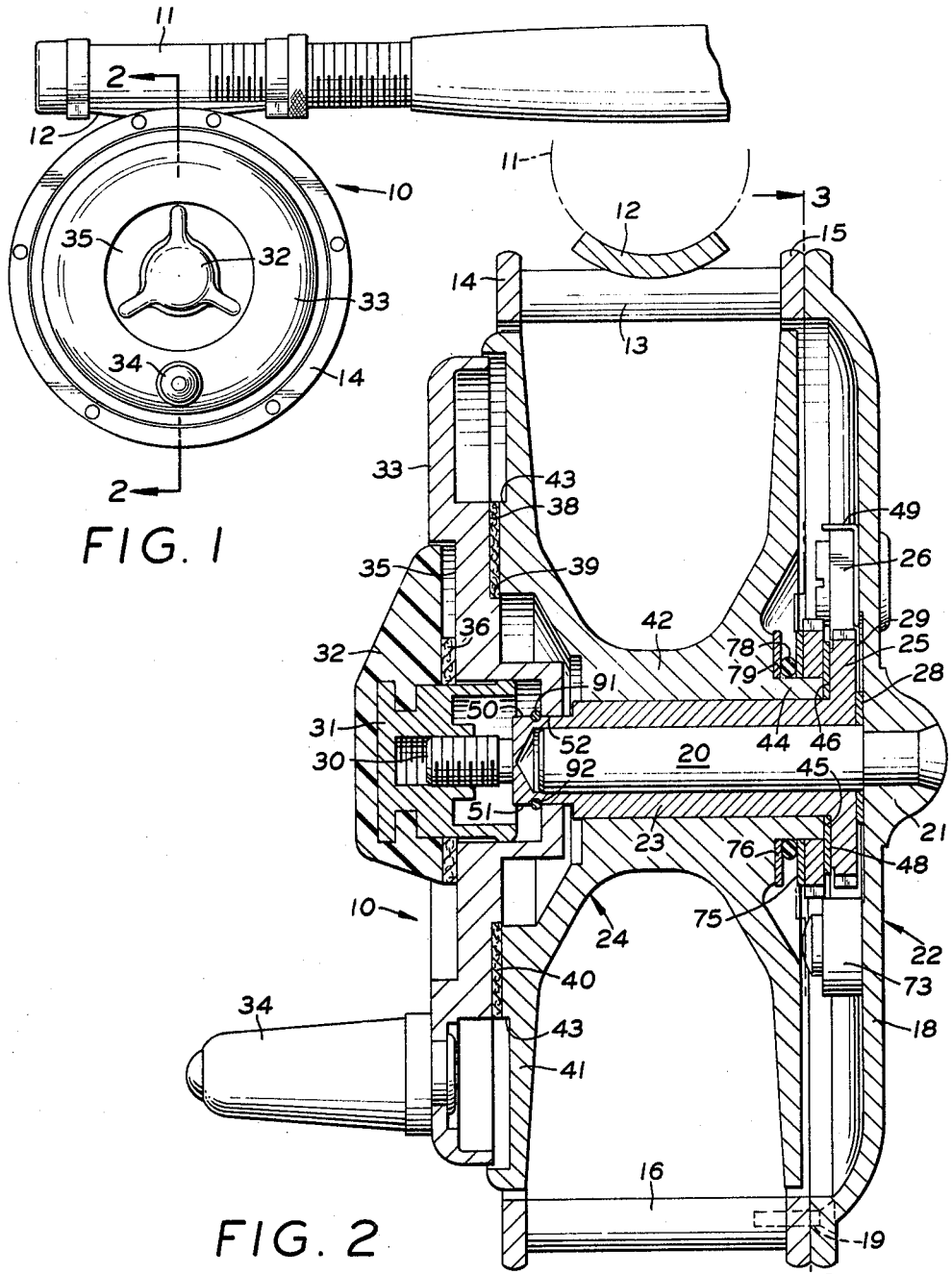
FIG. 1 is a side elevation of a fly reel embodying the concept of the present invention mounted on the reel seat of a conventional fly rod.
FIG. 2 is an enlarged vertical cross section taken substantially on line 2—2 of FIG. 1.

Referring more particularly to the drawings, a fly reel embodying the concept of the present invention is indicated generally by the numeral 10. The reel 10 is secured to the reel seat 11 of a fly rod by the foot 12 on cross plate 13 in the customary fashion.

Annular spacing rings 14 and 15, respectively, extend transversely outwardly from the cross plate 13 and are stabilized by peripherally spaced pillars 16 extending therebetween. As seen in FIG. 2, the annular rings 14 and 15 are positioned on the left and right, respectively. For convenience of description the ring 14 will designate the front of the reel and ring 15 the back.

A back plate 18 is secured to the back ring 15, as by screws 19 which also secure the ring 15 to the cross plate 13 and the pillars 16. The front ring 14 is similarly secured to the cross plate and pillars. A stub shaft which forms the axle 20 of the reel is nonrotatably affixed to, and extends perpendicularly outwardly from the nave 21 of the back plate 18. The nave 21 is located in the central portion of the back plate 18 so that the axle 20 extends concentrically of the spacing rings 14 and 15. The general assemblage of the cross plate 13, spacing rings 14 and 15, pillars 16, back plate 18 and axle 20 forms the housing 22 of the reel 10.

A sleeve-like spool mount 23 is rotatably carried on axle 20, and the line spool 24 is, in turn, rotatably carried on mount 23. That end of the sleeve-like spool mount 23 closest to the back plate 18 terminates in a radially extending ratchet 25 which, when engaged by pawl 26, permits rotation of the spool mount 23 in only one direction. An axle washer 28 is positioned between the back face 29 of the ratchet 25 and the nave 21 to minimize frictional resistance therebetween.

The end of the spool mount 23 opposite the ratchet 25 presents a threaded spindle 30 on which is mounted a cap nut 31. A brake knob 32 is fixed to the cap nut 31 so that manual rotation of the knob 32 rotates the nut 31.

Axially slidable along, but nonrotatable with respect to, the spool mount 23 is a crank disc 33 to which the handle 34 is attached. The central, outer face 35 of disc 33 is engaged, through friction washer 36, by the brake knob 32. The inner side of the crank disc 33 presents a ring-like pressure face 38 preferably bounded with an annular shoulder 39 to retain a friction washer 40.

On the front flange 41 of spool 24, which extends generally radially of the spool hub 42, is a raised brake head 43 opposed to the pressure face 38 on crank disc 33 and against which the friction washer 40 can be forced.

A hub extension 44 of lesser diameter than the spool hub 42 extends radially of the hub 42 and terminates in a radial compression surface 45 oriented transversely the rotational axis of the spool 24 and opposingly facing the front face 46 of the ratchet 25. A friction washer 48 is positioned between the compression surface 45 and the front face 46 of ratchet 25.

Figure 3:
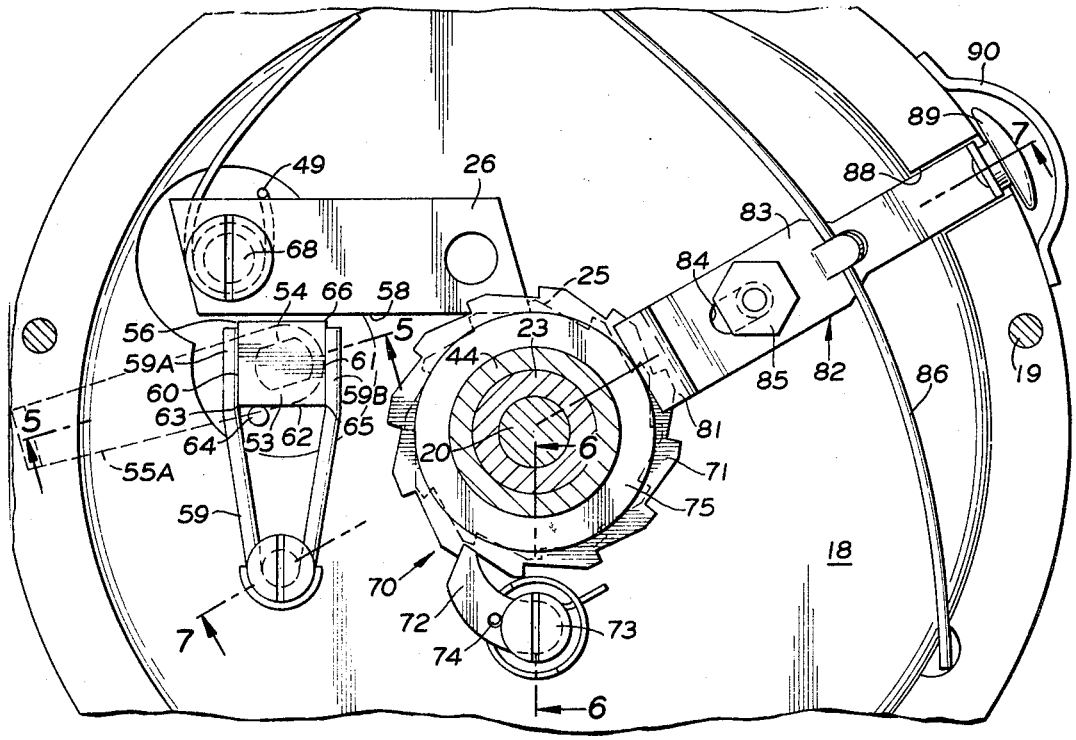
FIG. 3 is a further cross section taken substantially on line 3—3 of FIG. 2.

The friction washers 40 and 48 are the principal washers in the primary drag means, and they permit selective variation of the drag desired to resist relative rotation between the spool 24 and the spool mount 23. The pawl 26 is biased, by spring 49, toward engagement with ratchet 25, as shown in FIG. 3.

Inasmuch as the ratchet 25, through the engagement of the flats 50 and 51 on spool mount 23 with the mating aperture 52 through crank disc 33, is nonrotatable with respect to handle 34, the handle 34 can, when the pawl 26 engages ratchet 25, rotate the crank disc 33 and spool mount 23 in only one direction. As such, when the fisherman, in playing the fish, desires to let the fish run, and so permit line to be stripped from the spool 24, he may do so by manipulation of the drag knob 32 which varies the frictional resistance offered against rotation of the spool 24 relative to its mount 23. Turning the knob 32 in one direction compresses the friction washer 40 between the pressure face 38 and brake head 43 and at the same time compresses friction washer 48 between the hub extension 44 and the ratchet 25. This increases the frictional resistance, or primary drag, offered against relative rotation between line spool 24 and the spool mount 23. Turning the knob 32 in the opposite direction decreases the drag.

For many types of game fishing this drag is preset to allow rotation of the spool 24 with respect to its mount 23 at any time when a selected force is exerted against the line. By this arrangement tippets, or leaders, are not snapped or light hooks are not straightened when the fish suddenly, or unexpectedly, turns to run with the line, both of which result in lost fish.

Even though this primary drag means is prset to protect the weakest link in the chain of line, leader and lure, that drag may, nevertheless, offer too great a resistance to the fisherman as he strips line from the reel preparatory to and during the cast. It is for that reason that the subject reel 10 is provided with a primary drag release.

A pawl release cam 53 is carried on a cam shaft 54 which extends through the back plate 18 and supports a lever 55 on the exterior of the reel 10. With the lever 55 in the position 55A depicted in FIG. 3, the cam 53 does not engage pawl 26 and the spring 49 biasingly maintains the pawl 26 in engagement with the ratchet 25. An approximately 45° rotation of the lever 55 from position 55A to the position 55B depicted in FIG. 4 brings the apex 56 of cam 53 against the cam follower surface 58 on pawl 26 to retract the pawl from ratchet 25.

The cam 53 is preferably in the shape of a square and a positioning spring 59 is mounted on back plate 18 so that its two legs 59A and 59B straddle the cam to engage the opposed sides 60 and 61 when the lever 55 is in position 55A. The engagement of spring legs 59A and 59B with the cam sides 60 and 61, respectively, biasingly maintains the lever 53 in position 53A, and the engagement of that portion of the side 62 in proximity to corner 63 against the stop pin 64 on back plate 18 prevents inadvertent movement of lever 55 beyond position 55A when it is desired that the pawl 26 engage ratchet 25.

Similarly, the side 62 also engages stop pin 64 when the lever 55 is in position 55B, but then in proximity to corner 65. By rotating lever 55 sufficiently so that apex 56 is slightly over-center when the lever is in position 55B, the biasing action of spring 49 tends to lock the pawl 26 in retracted position and the corresponding over-center position of the corners 63 and 66 on cam 53 with respect to the spring legs 59A and 59B tends also to maintain the pawl 26 in retracted position.

It should be noted that by making the pawl 26 in the shape of a parallelogram it may be simply reversed on its mounting stud 68 should it become too worn effectively to engage the ratchet 25. The cam 53 too, by being square, allows for its operability in more than just one position should wear occasion that it be repositioned.

Figure 4:
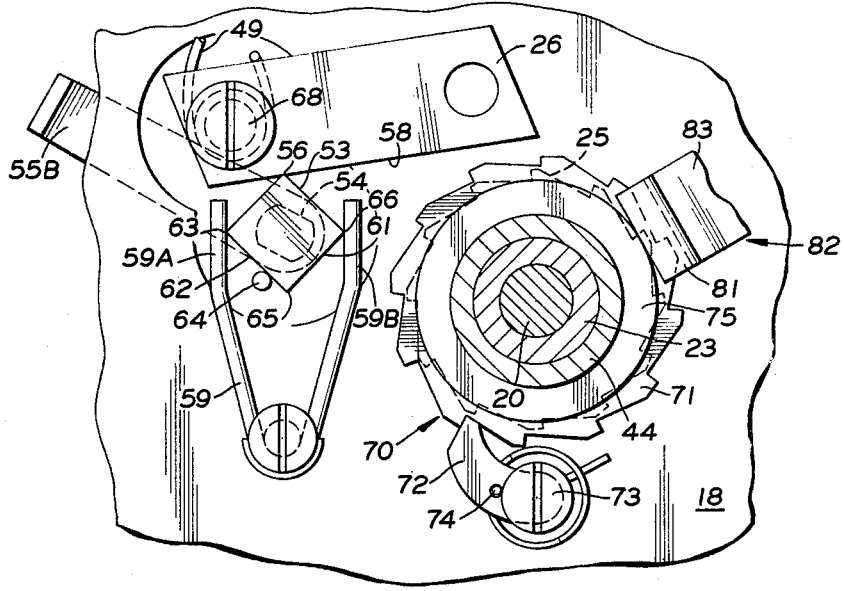
FIG. 4 is the partial area of a cross-section similar to FIG. 3 with the parts depicted in a position where the primary drag means is ineffective.
Figure 5:
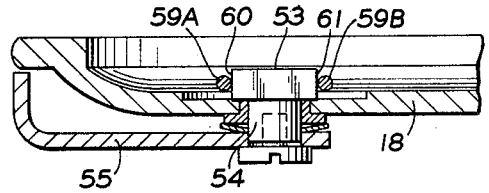
FIG. 5 is a further cross section taken substantially on line 5—5 of FIG. 3.
Figure 6:
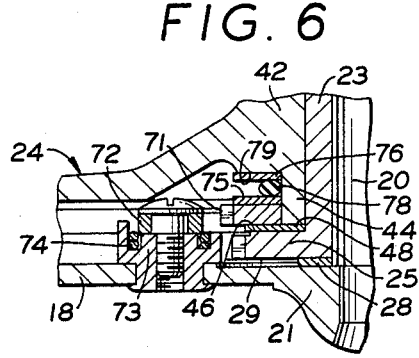
FIG. 6 is a further cross section taken substantially on line 6—6 of FIG. 3; and, FIG. 7 is a further cross section taken substantially on line 7—7 of FIG. 3.

As long as the pawl 26 is in the retracted position depicted in FIG. 4, the primary drag means is ineffectual since, with no additional restraint, the spool 24 and spool mount 23 would be able to rotate as a unit on axle 20. In this condition the fisherman could strip line with no resistance being offered by the spool. Having no drag, however, is as equally undesirable as having too much drag. Too much drag to overcome is ruinous to the critical timing of the back cast-pause-forward cast sequence incident to fly casting, and no drag permits the spool 24 to overrun as the fisherman strips off his line for the cast. Overrun is the term given to that rotation of the spool beyond that required for the amount of line removed. The result is the fisherman's anathema—the backlash.

In the subject reel 10 a secondary drag means 70 is provided which is operative at least when the primary drag is released by retraction of the pawl 26.

A second ratchet wheel 71 is rotatably mounted on the hub extension 44 and is engaged by a second pawl 72. The second pawl 72 is rockably mounted on a stanchion 73 secured to the backplate 18, and a spring 74 continuously biases the pawl 72 into engagement with the second ratchet wheel 71.

The radial extent of the friction washer 48 in the primary drag means is sufficient to prevent the second ratchet wheel 71 from directly engaging the front face 46 of the primary ratchet 25, and a friction washer 75 of the secondary drag means engages the opposite side of the ratchet wheel 71. The friction washer 75 and another friction washer 76 are both mounted on the hub extension 44 and separated by a resilient annulus, such as O-ring 78.

The front-most washer 76 is seated against a boss 79 which defines the joinder of the hub extension 44 to the hub 42. The extent to which the combined axial thickness of the two friction washers 75 and 76, the O-ring 78 and the ratchet wheel 71 exceeds the axial extent of the hub extension 44 is a measure of the amount of resistance imparted by the secondary drag means.

Rotation of the line spool 24 to retrieve line is not impeded by either the primary or the secondary drag means. However, when the pawl 26 is engaged with the ratchet wheel 25 counter-rotation of the spool 24—that is the direction of rotation by which line is removed from the spool—is retarded by the degree to which the primary drag means retards rotation of the line spool 24 with respect to the spool mount 23. And, when the pawl 26 is disengaged from the ratchet 25 the line spool 24 and spool mount 23 may also rotate as a unit in a line retrieving direction, unimpeded by either the primary or secondary drag means.

Counter rotation with the pawl 26 disengaged from ratchet 25 is, however, retarded by the degree to which the secondary drag means retards rotation of the line spool 24. Engagement of the secondary pawl 72 with ratchet wheel 71 prevents any counter rotation of the ratchet wheel 71 with the spool 24 so that the spool 24 and spool mount 23 will counter rotate as a unit, retarded by the frictional resistance imparted by the secondary drag means against rotation of the spool and spool mount with respect to the ratchet wheel 71.

The degree to which the cumulative thickness of the two washers 75 and 76, the O-ring 78 and the ratchet wheel 71 exceeds the hub extension 44 is selected so that the spool 24 and spool mount 23 rotating together will not overrun as a result of the fisherman stripping line from the spool for the cast and at the same time not offer sufficient resistance that the angler's timing will be affected as he strips line from the reel during the actual casting procedure.

Figure 7:
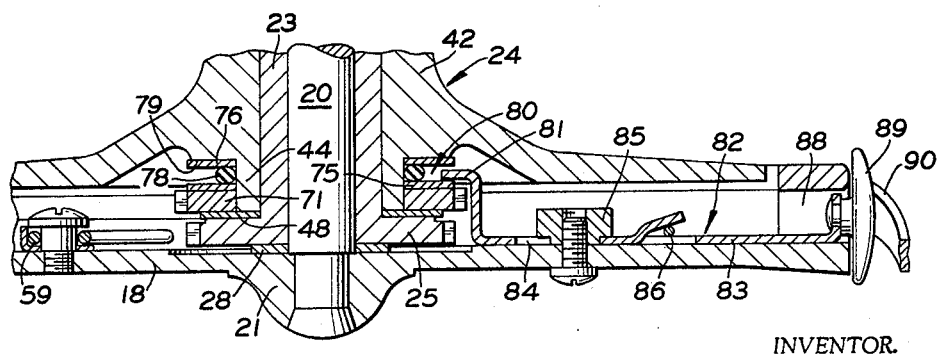

As shown in FIG. 7 the ratchet wheel 71 and adjacent friction washer 75 serve as a keeper 80 for engagement by the head 81 of lock bolt 82. The body portion 83 of the lock bolt 82 is slidably received against the back plate 18 with the head 81 being laterally offset therefrom to engage the keeper 80 and thereby retain the spool 24 and spool mount 23 within the housing 22.

The body portion 83 is longitudinally slotted, at 84, to engage a slide guide 85 mounted on the back plate 18 which permits reciprocal movement of the lock bolt 82, although a wire spring 86 biases the bolt 82 continuously inwardly to the latched position.

The lock bolt 82 extends radially outwardly through an aperture 88 in the back plate 18 and carries a button 89 exteriorly of the reel 10 which may be hand operated against the biasing action of spring 86 to disengage the head 81 from the keeper 80 when it is desired to remove the spool 24 and spool mount 23 from the reel 10.

A guard 90 is secured to the reel housing 22 to protect the button 89 from inadvertent manipulation.

With the lock bolt 82 moved to the unlatched position the head 81 is retracted from the keeper 80, and the spool 24 and spool mount 23, together with the crank disc 33 and associated primary and secondary drag washers, can be easily extracted from the housing 22 by sliding them axially of the axle 20.

The line spool 24 itself may be further separated from the extracted assembly. To remove the spool the control knob 32 is turned until the nut 31 becomes unscrewed from spindle 30. The retaining clip 91 may then be removed from its receiving notch 92 on the spool mount 23 and the crank disc 33 may thereafter be translated from the spool mount 23. This allows removal of the spool 24 itself and permits the angler the convenience of spool replacement when it is desired to change lines to suit the particular fishing conditions encountered.

It should now be apparent that a fly reel embodying the concept of the present invention incorporates an adjustable, selectively operable primary drag means to accommodate the conditions incident to playing a fish, a secondary drag to accommorate the conditions incident to casting, and otherwise accomplishes the objects of the invention.

What is claimed is:

1. In a fly reel having a housing with a line spool mounted for rotation in one direction about an axle secured to the housing to retrieve line and counter rotation to allow line to be stripped therefrom, a crank means operatively connected only to rotate said spool to retrieve line, the improvement comprising, a spool mount interposed between the axle and the line spool, the crank means being joined directly to a portion of said spool mount so that rotation of the crank means assures rotation of the spool mount, the line spool being rotatable with and with respect to said spool mount, a primary drag means, said primary drag means operative between the line spool and the joined crank means and spool mount, knob means connected to said pool mount outward of said portion and providing the sole adjustment in the amount of resistance offered by said primary drag means, antireverse means operative between the housing and the joined crank means and spool mount, control means selectively to engage and disengage said primary drag means and correspondingly engaging and disengaging said antireverse means, and secondary drag means, said secondary drag means continuously restricting counter rotation of said line spool.

2. A fly reel comprising, a housing with an axle, a spool mount rotatably received on said axle, a line spool mounted on said spool mount for rotation with and with respect thereto, rotation of said line spool in one direction retrieving line, counter rotation of said line spool allowing line to be stripped therefrom, crank means connected to a portion of said spool mount for rotating said spool mount, a primary drag means operatively connecting said line spool with said crank means and spool mount, knob means connected to said spool mount axially outward of said portion to provide the sole adjustment of said primary drag means, control means selectively to engage and disengage said primary drag means, and a secondary drag means, said secondary drag means connected between said housing and the line spool and spool mount continuously to restrict counter rotation of the line spool and spool mount with respect to said housing.

3. A fly reel comprising, a housing with an axle, a spool mount rotatably received on said axle, a line spool mounted on said spool mount for rotation with and with respect thereto, rotation of said line spool in one direction retrieving line, counter rotation of said line spool allowing line to be stripped therefrom, crank means for rotating said spool mount, a primary drag means operatively connecting said line spool with said crank means, control means selectively to engage and disengage said primary drag means, a secondary ratchet wheel, said secondary ratchet wheel carried on and being rotatable with and with respect to said line spool and spool mount, friction means to resist rotation of said secondary ratchet wheel with respect to said line spool and spool mount, a secondary pawl means engaging said secondary ratchet wheel, said secondary pawl means allowing rotation of said secondary ratchet wheel when rotated with said line spool to retrieve line and preventing counter rotation of said secondary ratchet wheel.

4. A fly reel, as set forth in claim 3 in which a primary anti-reverse pawl permits rotation of said spool mount when rotated with said line spool to retrieve line and prevents counter rotation of said spool mount.

5. A fly reel, as set forth in claim 4, in which the control means for selectively engaging and disengaging said primary drag means is a cam means for controling movement of said primary anti-reverse pawl into and out of engagement with said spool mount.

6. A fly reel, as set forth in claim 5, in which a spring means continuously biases said primary pawl means into engagement with said spool mount and a second spring means continuously biases said secondary pawl means into engagement with said secondary ratchet wheel.

7. A fly reel comprising, a housing with an axle, a spool mount rotatably received in said axle, a line spool, said line spool having a hub rotatably engaging said spool mount so that said line spool may rotate with and with respect to said spool mount, rotation of said line spool in one direction retrieving line, counter rotation of said line spool allowing line to be stripped therefrom, crank means for rotating said spool mount, a primary drag means operatively connecting said line spool with said crank means, control means selectively to engage and disengage said primary drag means, a hub extension projecting axially of said hub, a secondary ratchet wheel rotatably received on said hub extension, friction means operative between said secondary ratchet wheel and said line spool to provide the counter rotational resistance of a secodnary drag means, and a secondary pawl means mounted on said housing for continuous engagement with said secondary ratchet wheel.

8. A fly reel, as set forth in claim 7, in which the spool mount has a radially extending primary ratchet, a primary anti-reverse pawl is carried on said housing for engagement with the primary ratchet, and means selectively move said primary anti-reverse pawl into and out of engagement with the primary ratchet.

9. A fly reel, as set forth in claim 8, in which a spring continuously biases the primary anti-reverse pawl into engagement with the primary ratchet and a cam means engages said primary anti-reverse pawl to move said anti-reverse pawl out of engagement with the primary ratchet.

10. A fly reel, as set forth in claim 9, in which the secondary ratchet wheel and the friction means operative between said secondary ratchet wheel and the line spool are axially compressible along said hub extension and against a boss on said line spool to provide the counter rotative resistance of the secondary drag means.

11. A fly reel, as set forth in claim 10, in which the hub extension opposingly faces the primary ratchet, a friction washer means being received between said hub extension and the primary ratchet, knob means for compressing said friction washer between said hub extension and the primary ratchet, said secondary ratchet wheel and the friction means operative between said secondary ratchet wheel and said line spool being axially compressed against the boss on said line spool by the primary ratchet on said spool mount.

12. A fly reel, as set forth in claim 11, in which a friction washer between the line spool and the crank means as well as the friction washer between the hub extension and the primary ratchet on said spool mount imparts the counter rotative resistance of said primary drag means.

References Cited
UNITED STATES PATENTS

| | | | |
|---|---|---|---|
| 1,284,039 | 11/1918 | Atwood. | |
| 2,498,626 | 2/1950 | Bivans | 242—84.45 |
| 2,568,245 | 9/1951 | McDonald | 242—84.45 |
| 2,648,506 | 8/1953 | Kirby | 242—84.45 |
| 2,686,016 | 8/1954 | Kilian. | |
| 2,765,990 | 10/1956 | Engel | 242—84.44 |

BILLY S. TAYLOR, Primary Examiner